Jan. 19, 1954    P. AUDEMAR    2,666,659
PACKING DEVICE
Filed April 4, 1950

INVENTOR.
PIERRE AUDEMAR
BY
Richardson, David and Nordon
Atty's

Patented Jan. 19, 1954

2,666,659

UNITED STATES PATENT OFFICE 2,666,659

PACKING DEVICE

Pierre Audemar, Villesnes, France, assignor, by mesne assignments, to Olaer Marine, Paris, France, a company of France Application April 4, 1950, Serial No. 153,893

Claims priority, application France April 7, 1949

7 Claims. (Cl. 286—26)

This invention relates to packing devices to be interposed between two parts or members slidable with respect to one another and, more particularly, between a cylinder and a piston reciprocating in said cylinder.

Many attempts have been made heretofore to provide a perfect tightness between two parts slidable with respect to one another and a great number of solutions have been proposed to resolve this problem; these solutions, however, are more or less perfect and depend upon the nature of the fluid and upon the difference between the pressures to be exerted on either side of the packing device.

It has been proposed, in particular, to provide the required tightness by means of a tapered metal packing device, the thinnest portion of which constitutes a lip adapted to fit tightly with an elastic contact against either of the parts to be sealed with respect to one antoher. Such packing devices have been found particularly efficient in the case of devices in which the fluid against which the devices are to be made tight is oil or a substance, the viscosity of which is still higher than oil. In the case of pneumatic devices, however, the tightness is definitely unsufficient.

It has been tried heretofore, for improving the tightness of devices of this type to provide a grease mass held in the vicinity of the sealing lip. This last solution, however, is still unsatisfactory since a considerable space must be provided so as to have a grease mass extending along a sufficient surface to ensure the required tightness.

It has been also tried to provide packing devices comprising a groove having a generally rectangular cross-section in which an O-ring, i. e. a ring having a circular or elliptical cross-section, made of an elastic material, was housed, so as to be applied against the wall of the movable part with an elastic contact; the greater, however, the pressure difference on either side of the device, the smaller is the efficiency of said device, due to the fact that such an O-ring, when deformed, tends to be expelled into the space provided between the stationary and movable parts, space which cannot be avoided in order to ensure the sliding motion therebetween.

The object of this invention is to provide a packing device particularly adapted to pneumatic apparatus, essentially comprising in combination a tapered metal sleeve having a resilient lip and an O-ring made of an elastic material and housed in a groove, said groove being provided in a member solid with said metal sleeve and said groove being located in the close vicinity of said resilient lip.

It results from this construction that said resilient lip, while acting as a sealing means, prevents the O-ring from being expelled out of its groove into the space between the reciprocating parts, said O-ring being thus allowed to assume perfectly its sealing functions. Both sealing means have thus an optimum efficiency and the combination according to the invention ensures a perfect tightness against any fluid and, in particular, against air, even so when the difference of the pressures exerted on either side of the packing device is very high.

A packing device according to the invention may be interposed, at will, between a piston head and the inner wall of a cylinder in which said piston is slidably mounted and/or between the rod of such a piston and one cylinder end.

The invention will be more easily understood with reference to the accompanying drawings which represent, as a mere illustration, two embodiments of said invention.

Figure 1:
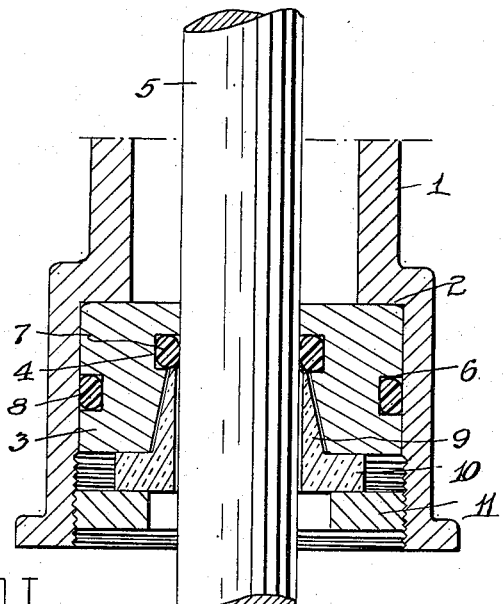
Fig. 1 is a vertical section of a packing device according to the invention, interposed between one cylinder end and a piston rod.

Referring first to Fig. 1, there is shown at 1 one end of a cylinder provided with a shouldering 2, on which bears a ring 3 provided with two grooves having a rectangular cross section, viz. an inner groove 4 adjacent to a piston rod 5 and an outer groove 6 adjacent to cylinder 1. A sealing O-ring made of a suitable elastic material, such as rubber, is housed in each groove, said O-rings being respectively designated by reference numerals 7 and 8. Ring 3 is moreover provided with a conical inner recess extending from groove 4 and flaring outwardly towards the base of the ring. A metal tapered sleeve 9 is disposed in said recess, said sleeve terminating, at the apex of the tapered portion, in a resilient lip having a cutting edge inwardly turned toward piston rod 5 which is adapted to closely and slidingly engage the surface of the piston rod, thus ensuring the desired tightness in the manner of a scraper ring.

The above described resilient lip is in contact with the inner sealing O-ring 7 so that, while performing its sealing functions, it prevents said O-ring from penetrating between the piston rod and ring 3. Sleeve 9 is provided at its lower end with a flange 10 on which is screwed a threaded washer 11 which rigidly secures the whole device.

Figure 2:
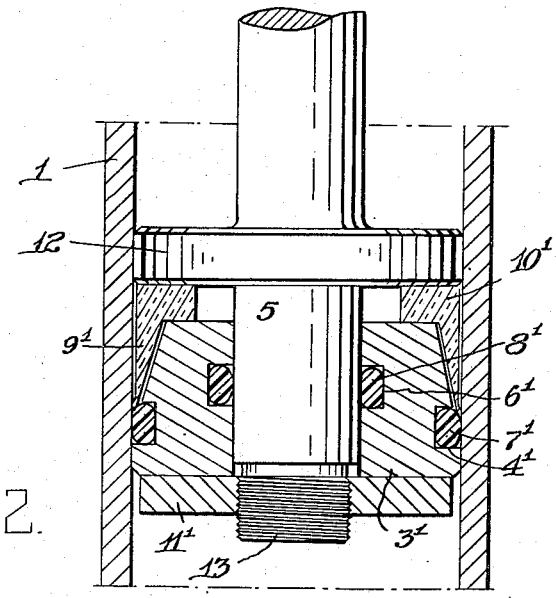
Fig. 2 is a vertical section of a packing device according to the invention, interposed between a piston and the inner wall of the cylinder in which said piston is slidably mounted.

Referring now to Fig. 2, the packing device, constituted by the same parts as in Fig. 1, is now fixed to the piston rod instead of being secured to the cylinder. In this figure, the parts corresponding to those of Fig. 1 are designated by the same reference numerals followed by a prime sign ('). Ring 3' is still provided with two grooves having a rectangular cross-section 4' and 6' adjacent to piston rod 5' and the inner wall of cylinder 1', respectively. Each one of said grooves encloses, as previously, an O-ring; ring 3' is, however, provided with an outer recess instead of being provided with an inner recess as in Fig. 1 and said recess is engaged with a sleeve 9', the flange 10' of which is directed inwardly and the flared body of which terminates in a resilient lip which is now outwardly folded and which is in tight contact with the inner wall of cylinder 1'. As previously, ring 7' is in direct contact with the resilient lip of sleeve 9' and assumes the same functions as in Fig. 1. Sleeve 9' bears at its upper portion on the flange 12 of the piston. Finally, the whole device is secured on the piston by a threaded washer 11' screwed upon the threaded end 13 of said piston.

It will be understood that the invention is in no way limited to the embodiments described and shown and that many modifications may be made thereto within the scope of the invention. Thus, for example, two packing devices according to the invention may be used simultaneously, one of them being secured, as shown in Fig. 1, in that end of the cylinder through which the piston rod is slidably mounted and the other one being secured on the piston head as shown in Fig. 2.

What is claimed is:

1. A packing device of the class described, for effecting sealing engagement between first and second members reciprocably movable with respect to each other and having mutually loosely engaging cylindrical surfaces between which said sealing is required, said first one of said members having a circumferential groove formed therein adjacent to said cylindrical surface of said second member, said packing device comprising: a sealing ring of resilient material disposed in said groove and engaging said second member; and a sleeve member fixed with respect to said first member, said sleeve member comprising a conically surfaced portion tapering to a thin lip, said lip being turned for close engagement with said second member, said turned portion of said lip further abutting against said sealing ring for retaining said ring in said groove.

2. A packing device according to claim 1, wherein said groove is of rectangular cross-section and said ring is of generally circular cross-section.

3. A packing device according to claim 1, wherein said second member is a cylinder whose internal surface is engaged by said ring, said circumferential groove being formed in the external surface of said first member.

4. A packing device according to claim 3, wherein said groove is of rectangular cross-section and said ring is of generally circular cross-section.

5. A packing device according to claim 1, wherein said second member is a cylinder whose external surface is engaged by said ring, said circumferential groove being formed in the internal surface of said first member.

6. A packing device according to claim 5, wherein said groove is of rectangular cross-section and said ring is of generally circular cross-section.

7. A packing device according to claim 1, in which fluid under pressure is applied to one side of said first member and wherein said turned portion of said lip engages against said sealing ring in the direction opposite to the direction of pressure thereon caused by said fluid, whereby said fluid pressure urges said sealing ring into closer engagement with said turned portion of said thin lip and thus urges the latter into closer engagement with said second member.

PIERRE AUDEMAR.

References Cited in the file of this patent

UNITED STATES PATENTS

| Number | Name | Date |
|---|---|---|
| 1,121,797 | Campbell | Dec. 22, 1914 |
| 1,481,160 | Switzer | Jan. 15, 1924 |
| 1,945,524 | Foehr | Feb. 6, 1934 |
| 2,281,780 | Mercier | May 5, 1942 |
| 2,430,492 | Carlson | Nov. 11, 1947 |

FOREIGN PATENTS

| Number | Country | Date |
|---|---|---|
| 573,510 | France | Mar. 12, 1924 |
| 325,192 | Great Britain | Feb. 20, 1930 |